UNITED STATES PATENT OFFICE.

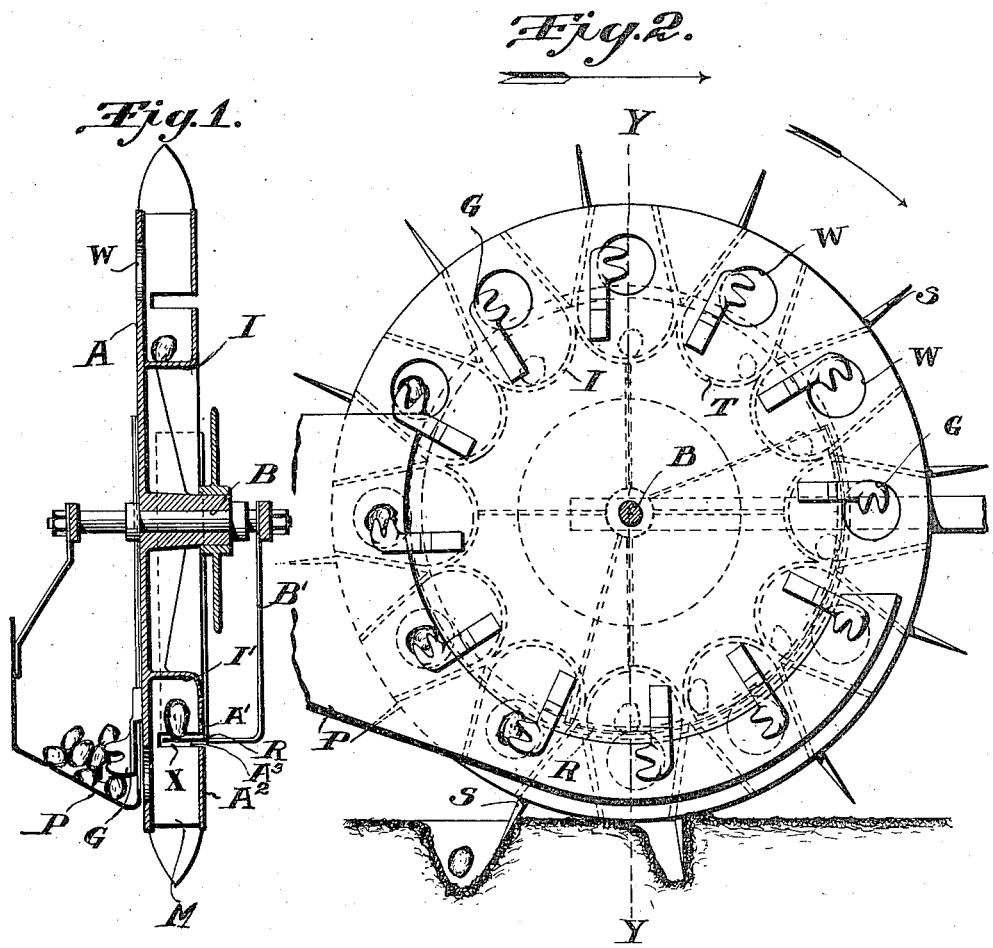

MAX LESSER, OF POSEN, GERMANY, ASSIGNOR TO THE FIRM OF GEBRÜDER LESSER, OF POSEN, GERMANY.

POTATO-PLANTER.

1,068,673.  Specification of Letters Patent.  Patented July 29, 1913.

Application filed July 31, 1912. Serial No. 712,565.

*To all whom it may concern:*

Be it known that I, MAX LESSER, a subject of the Emperor of Germany, and residing at Posen, Prussia, Germany, have invented certain new and useful Improvements in Potato-Planters, of which the following is a specification.

This invention relates to potato planters of the kind in which a feeding wheel provided with separate chambers or pockets for the reception and transport of single potatoes, and with spades for forming holes in the soil into which the potatoes are to be singly bedded, is made use of.

More particularly, the invention relates to said chambers or pockets and to the means for opening and closing the same at the proper time.

The objects of my invention are, first, to render the machine more reliable in its action, second, to retain the potatoes more securely in the pockets until they are to be freed, and third, to simplify the construction.

In order to make my invention more clear, I refer to the accompanying drawing, in which similar letters denote similar parts throughout the several views, and in which:

Figure 1 is a vertical section on the line $y-y$ of Fig. 2 showing a feeding wheel of a potato planter as constructed according to my invention; Fig. 2 is a side elevation of said wheel, some of the inner parts being shown in dotted lines.

The pocket and spade wheel of the potato planter is provided with curved partition walls I arranged in a circle around the axle B of the wheel and some distance from the same, and fixed at one side to the wheel disk A and at the other side to two concentric annular plates $A^1$ and $A^2$ having between them a circular slot $A^3$. This slot extends to each pocket or compartment formed by said partition walls into the side parts of these walls (see at X Fig. 1) and a curved plate R carried by the axle B by arms $B^1$, reaches into the main slot $A^3$, as well as into the side or by-slots X dividing each compartment into a pocket proper $I^1$ and an outlet channel M through which the potatoes drop into the holes dug by the spades S.

The potatoes are taken from a receptacle P arranged at the side of the wheel plate A; this plate has apertures W located about in the middle with respect to each compartment, and grippers G are fixed to the plate A just in front of said apertures W. The shape of the grippers is such that they drop the potatoes through the apertures into the pocket portions $I^1$ of the compartments as soon as the potatoes reach the upper half of the wheel; the potatoes are then carried around inside the wheel until they arrive at and upon the circular plate R, which now supports them down to its lower end, when each potato falls exactly into the hole provided for it by the respective spades.

What I claim as new and desire to secure by Letters Patent is:

1. In a potato planter the combination with a feeding wheel of compartments each adapted to receive one potato, a lateral inlet aperture for each compartment, an outlet channel for each compartment and means adapted to retain the potatoes in their compartments.

2. In a potato planter the combination with a feeding wheel of compartments each adapted to receive one potato, a lateral inlet aperture for each compartment, a radial outlet channel for each compartment and means adapted to retain the potatoes in their compartments.

3. In a potato planter the combination with a feeding wheel, spades for said wheel, compartments each adapted to receive one potato, a lateral inlet aperture for each compartment, an outlet channel for each compartment and means adapted to retain the potatoes in their compartments.

4. In a potato planter the combination with a feeding wheel, spades on said wheel, compartments each adapted to receive one potato, a lateral inlet aperture for each compartment, an outlet channel for each compartment, and a stationary curved plate being adapted to retain each potato in its compartment until it arrives over the hole made for it by the respective spade.

5. In a potato planter the combination with a feeding wheel, spades on said wheel, compartments each adapted to receive one potato, a lateral inlet aperture for each compartment, an outlet channel for each compartment of a continuous slot at the rear of said compartments, side slots forming lateral extension of said continuous slot, and a stationary circular plate reaching into this slot and extending from a point above the horizontal plane of the axle to a point behind the vertical plane of the same.

6. In a potato planter the combination with a feeding wheel of compartments each adapted to receive one potato, a lateral inlet aperture at each compartment, an outlet channel for each compartment, a stationary receptacle arranged at the side of said feeding wheel, grippers adapted to drop the potatoes through the said lateral apertures into the said compartments and means adapted to retain the potatoes in their compartments.

7. In a potato planter the combination with a feeding wheel of compartments each adapted to receive one potato, a lateral inlet aperture for each compartment, an outlet channel for each compartment, a stationary receptacle arranged at the side of said feeding wheel, grippers adapted to drop the potatoes through the said apertures into the said compartments and a stationary circular plate extending from a point above the horizontal plane of the axle to a point behind the vertical plane of the same and adapted to retain the potatoes in their compartments.

In testimony whereof I affix my signature in presence of two witnesses.

MAX LESSER.

Witnesses:
WOLDEMAR HAUPT,
HENRY HASPER.

Copies of this patent may be obtained for five cents each, by addressing the "Commissioner of Patents, Washington, D. C."